United States Patent
Clephas

(10) Patent No.: US 6,929,316 B2
(45) Date of Patent: Aug. 16, 2005

(54) SPRING ASSEMBLY FOR AN OPEN ROOF CONSTRUCTION FOR A VEHICLE, AND OPEN ROOF CONSTRUCTION PROVIDED THEREWITH

(75) Inventor: Peter Clephas, Sevenum (NL)

(73) Assignee: Inalfa Roof Systems Group B.V. (NL)

( * ) Notice: Subject to any disclaimer, the term of this patent is extended or adjusted under 35 U.S.C. 154(b) by 0 days.

(21) Appl. No.: 10/452,374

(22) Filed: Jun. 2, 2003

(65) Prior Publication Data
US 2003/0222482 A1 Dec. 4, 2003

(30) Foreign Application Priority Data
Jun. 4, 2002 (EP) ............................................ 02077747

(51) Int. Cl.⁷ .................................................. B60J 7/22
(52) U.S. Cl. ..................................................... 296/217
(58) Field of Search ........................................ 296/217

(56) References Cited
U.S. PATENT DOCUMENTS 4,482,183 A  11/1984  Grimm et al. ............. 296/217
4,781,410 A  11/1988  Gantner et al. ............. 296/217
4,986,598 A  1/1991   Yamauchi et al. .......... 296/217

FOREIGN PATENT DOCUMENTS

| JP | 2000-85367 | * | 3/2000 |
| JP | 2000-85368 | * | 3/2000 |
| JP | 2000-85369 | * | 3/2000 |

* cited by examiner

*Primary Examiner*—Dennis H. Pedder
(74) *Attorney, Agent, or Firm*—Westman, Champlin & Kelly, P.A.; S. Koehler

(57) ABSTRACT

A spring assembly is provided for interposition between two elements of an open roof construction for a vehicle that are movable relative to each other. This spring assembly comprises three leaf springs, wherein a first leaf spring with a first end is connected to a first end of a second leaf spring while defining an acute angle therebetween, wherein a third leaf spring with a first end is connected to a second end of the second leaf spring while defining an angle therebetween, whereas the third leaf spring with a second end slidingly engages the first leaf spring, and wherein the first and second leaf springs each engage one of the elements. Further an open roof construction for a vehicle comprising such a spring assembly is described.

20 Claims, 2 Drawing Sheets

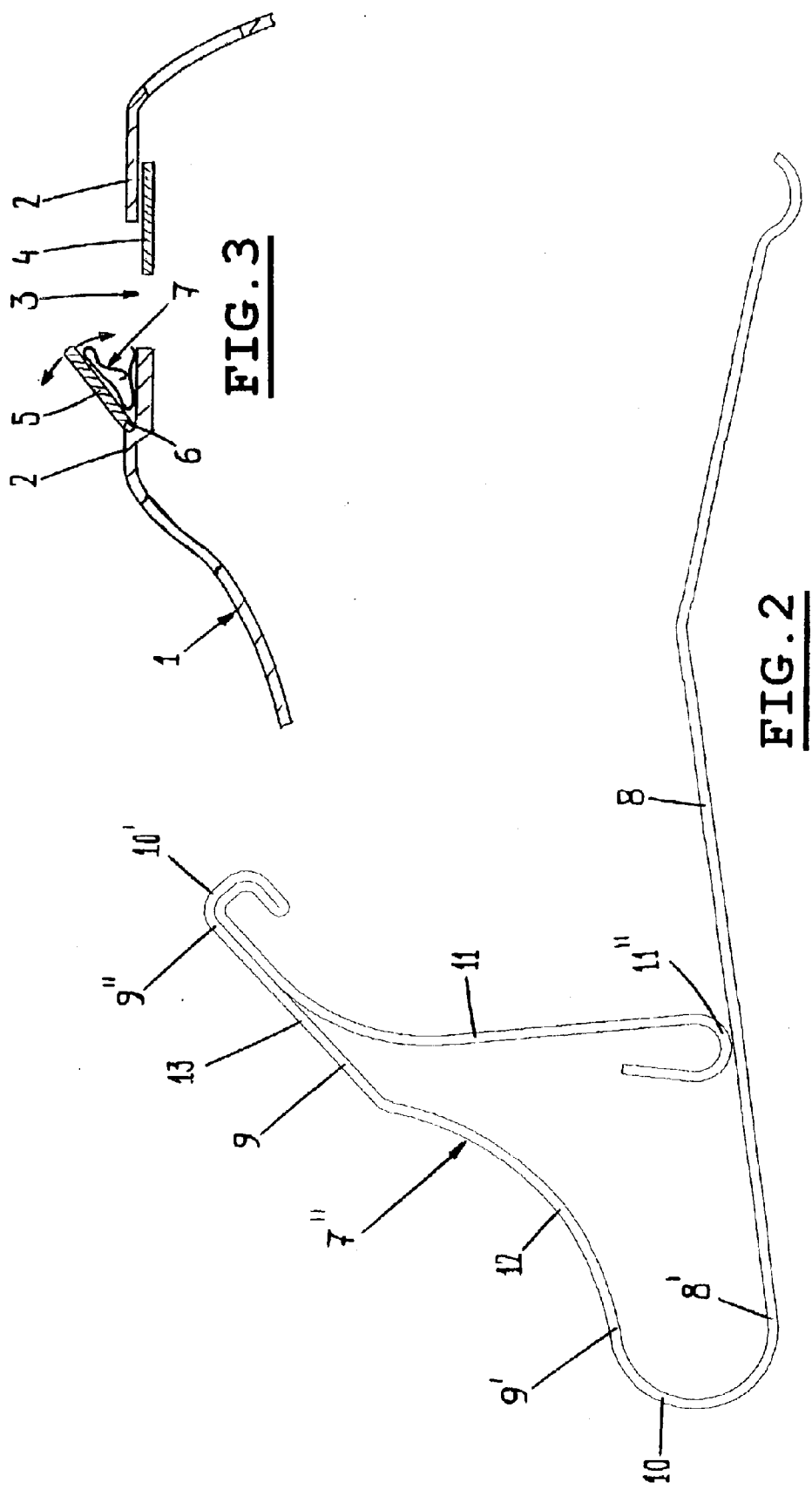

SPRING ASSEMBLY FOR AN OPEN ROOF CONSTRUCTION FOR A VEHICLE, AND OPEN ROOF CONSTRUCTION PROVIDED THEREWITH

BACKGROUND OF THE INVENTION

The invention firstly relates to a spring assembly for interposition between two elements of an open roof construction for a vehicle that are movable relative to each other.

One example of such elements of an open roof construction for a vehicle is a fixed roof construction for a vehicle with a wind deflector hingeably connected therewith. Open roof constructions having large roof apertures require wind deflectors with a large vertical displacement (large angle of rotation). This displacement is aided by the spring assembly interpositioned between the fixed roof construction and the wind deflector. However, in the case of wind deflectors with large displacements, prior art spring assemblies feature an unacceptably large force difference in the operating range of the wind deflector. Such large force differences have a negative influence on the stable wind deflector position over the complete operating range thereof.

Further, an open roof construction often is equipped with a pinch detection system. When large force variations as mentioned above occur, it is very difficult, or even impossible, to adapt such a pinch detection system within acceptable pinch detection limits.

In the past, attempts have been made to provide spring assemblies coping with these problems. However, such spring assemblies suffer from several drawbacks, such as problems with metal fatigue and unacceptable large dimensions (i.e. package size).

SUMMARY OF THE INVENTION

It is an object of the present invention to provide an improved spring assembly solving at least some of the problems with prior art spring assemblies.

Thus, there is provided a spring assembly for interposition between two elements of an open roof construction for a vehicle that are movable relative to each other comprising three leaf springs, wherein a first leaf spring with a first end is connected to a first end of a second leaf spring while defining an acute angle therebetween, wherein a third leaf spring with a first end is connected to a second end of the second leaf spring while defining an angle therebetween, whereas the third leaf spring with a second end slidingly engages the first leaf spring, and wherein the first and second leaf springs each engage one of the elements.

The spring assembly provides over its operating range (first and second leaf springs being moved relative to each other by the elements) a dramatically reduced force variation. Thus, in the operating range from a first extreme position towards a second extreme position the two elements will be engaged by a nearly constant force.

Several parameters of the spring assembly play a role in determining the spring characteristic, and thus the variations of the force in the operating range of the spring assembly. Therefore, measures can be taken to influence the spring characteristic. These measures may be applied alone or in any desired combination.

In a first embodiment, the first leaf spring is concavely shaped with its concave side facing outwardly from the assembly. This concave shape allows a deformation of the first leaf spring while being loaded.

Such a concave shape can be realised when, for example, the first leaf spring substantially comprises two straight sections defining an obtuse angle therebetween.

In another embodiment, the second leaf spring is concavely shaped with its concave side facing outwardly from the assembly. As a result, the second leaf spring has a convex shape facing the third leaf spring, which will be engaged by the third leaf spring, thus influencing the spring characteristic in a well-defined manner.

In another embodiment, it is possible that the second leaf spring comprises an inward bay adjoining its first end and, connected therewith, a straight section adjoining its second end.

In still a further embodiment of the spring assembly according to the invention, the third leaf spring is positioned such that when the angle between the first and second leaf spring decreases, the second end of the third leaf spring moves along the first leaf spring towards the first end of the first spring. This arrangement, among others, contributes to a compact configuration of the spring assembly when loaded.

In this specific case, it further is possible, that the third leaf spring can be convexly shaped with its convex side facing inwardly such as to progressively engage the second leaf spring when the angle between the second and third leaf spring decreases. This feature also in a predetermined manner can influence the spring characteristic as desired.

The connections between the leaf springs may have any appropriated construction. However, when the leaf springs are integrally connected to each other, the construction and production of the spring assembly according to the invention is greatly simplified. In such an instance, the connections between the leaf springs may be defined as curved resilient sections, which in an advantageous manner, also can contribute to the desired spring characteristic.

In still another embodiment of the spring assembly, the second end of the first leaf spring and the second end of the third leaf spring are rounded. These rounded ends contribute to a smooth movement of those ends relative to engaging parts of the spring assembly.

Finally, an embodiment of the spring assembly according to the invention is mentioned, wherein the elements between which the spring assembly is interpositioned comprise a fixed roof construction and a wind deflector hingeably connected with the fixed roof construction.

The invention also relates to an open roof construction for a vehicle, comprising a fixed roof construction and a wind deflector hingeably connected with the fixed roof construction, wherein the fixed roof construction and the wind deflector are engaged by an interpositioned spring assembly according to the invention.

BRIEF DESCRIPTION OF THE DRAWINGS

The invention will now be elucidated referring to the drawing, in which some embodiments of a spring assembly according to the invention are illustrated.

FIG. 2 shows a second embodiment of a spring assembly according to the invention.

FIG. 3 shows, schematically, an open roof construction for a vehicle provided with a spring assembly according to the invention.

DETAILED DESCRIPTION OF THE PREFERRED EMBODIMENTS

Figure 1A:
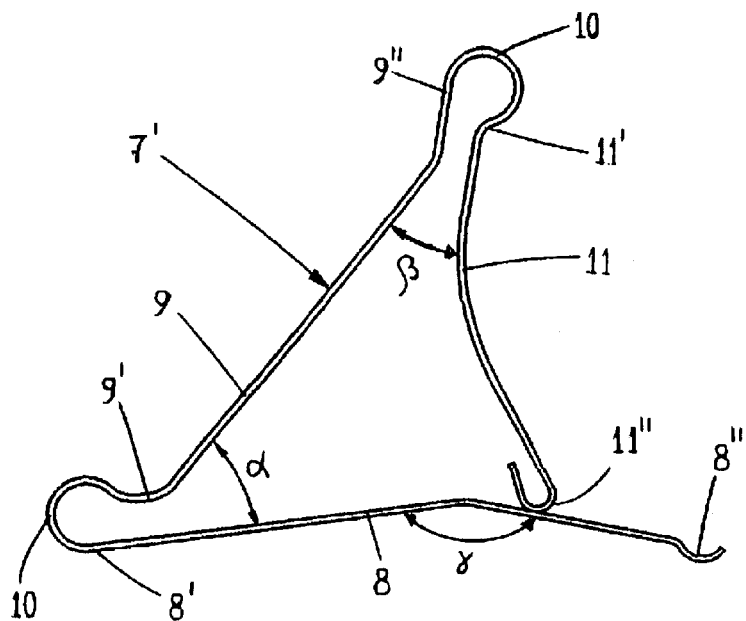
FIG. 1 shows an embodiment of a spring assembly according to the invention in three operative positions.

Referring to FIG. 3, there is shown schematically part of a vehicle 1 having a fixed roof construction 2 in which an open roof construction or assembly is provided comprising, a roof opening 3 which can be closed and opened by a movable panel 4. At the front side of the opening 3 a wind deflector 5 is hingeably connected with the fixed roof construction 2, e.g. by means of a hinge 6. Interpositioned between the fixed roof construction 2 and the wind deflector 5 is a spring assembly 7 as elucidated hereinafter.

The general construction and functioning of such an open roof construction for a vehicle is known per se, and thus will not be explained in detail here.

Figure 1B:
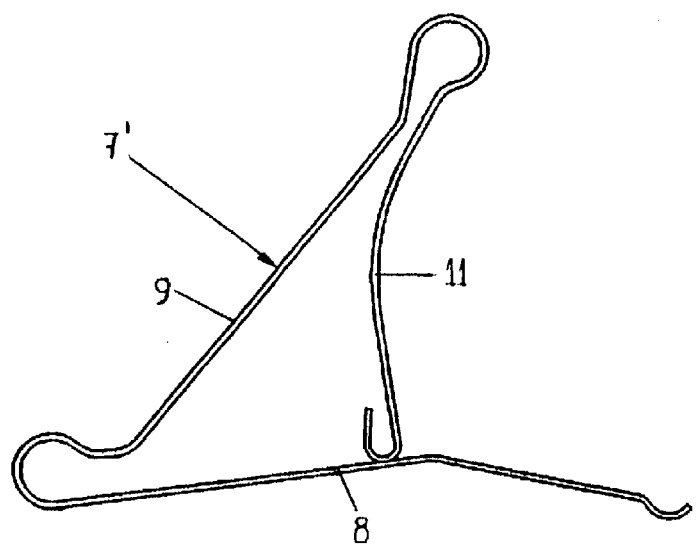

Now referring to FIG. 1, a first embodiment of a spring assembly 7' is illustrated. The position of the spring assembly 7' illustrated in FIG. 1a corresponds with a fully relaxed position of the spring assembly 7'. It is to be noted, however, that such a fully relaxed position generally will not be reached when the assembly 7' is mounted in an open roof construction, for example as shown in FIG. 3, because the wind deflector 5 will before be limited in its movement by an appropriate stop (not shown) FIG. 1b, however, shows a position, in which the spring assembly 7' is in its so-called maximum extended position, in which the wind deflector 5 has reached its extreme extended position (for example as illustrated in FIG. 3, and as defined by the stop) Thus, in the situation illustrated in FIG. 1b, the spring assembly 7' is pre-loaded. A relaxation towards the situation of FIG. 1a is prevented by the wind deflector, which in FIG. 1b will have reached one of its extreme positions (fully extended position).

Figure 1C:
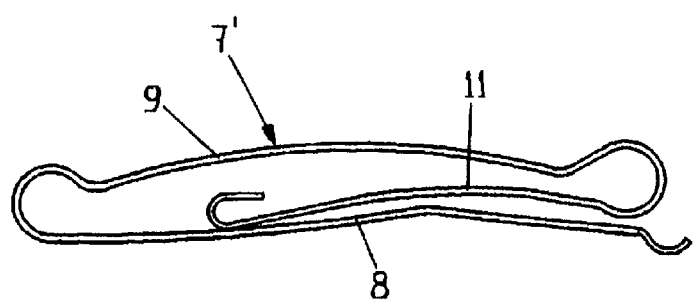

FIG. 1c shows a situation, which corresponds with a fully collapsed wind deflector 5, e.g. a wind deflector 5 which is fully housed in a corresponding recess (not shown in detail) in the fixed roof construction 2. This is a situation, in which generally the panel 4 closes the roof opening 3 and the wind deflector 5 not needs to be effective. In this position the spring assembly 7' is fully compressed.

The spring assembly 7' comprises a first leaf spring 8 with a first end 8' connected to a first end 9' of a second leaf spring 9. In the illustrated embodiment, the first end 8' of the first leaf spring 8 and the first end 9' of the second leaf spring 9 are connected by a curved section 10.

The second end 9" of the second leaf spring 9 is connected to a first end 11' of a third leaf spring 11. Again, this connection is shaped as a curved section 10. A second end 11" of the third leaf spring 11 slidingly engages the first leaf spring 8.

As can be seen, the second end 11" of the third leaf spring 11 can be rounded, as can be a second end 8" of the first leaf spring 8.

The first leaf spring 8 and second leaf spring 9 define an acute angle α therebetween. Likewise, the second leaf spring 9 and third leaf spring 11 define an angle β therebetween. Further, in the illustrated embodiment, the first leaf spring 8 can be composed of two straight sections defining an obtuse angle γ therebetween. As a result, the first leaf spring 8 is concavely shaped with its concave side facing outwardly from the assembly (downwardly in FIG. 1a).

In one embodiment, the leaf springs 8, 9 and 11 and connecting curved sections 10 are integrally connected and all manufactured of the same resilient material. In its operative position, the spring assembly 7' engages the wind deflector 5 with one of the leaf springs 8 and 9, and engages the fixed roof construction 2 with the remaining leaf springs 8 and 9.

In the maximum extended position of the spring assembly 7' as illustrated in FIG. 1b (corresponding with the fully extended position of the wind deflector 5) the third leaf spring 11 is positioned such (especially with its second end 11") that when the angle α between the first leaf spring 8 and second leaf spring 9 decreases its second end 11' moves along the first leaf spring 8 towards the first end 8' thereof (resulting in a decreasing angle β). This allows the assembly 7' to reach the fully compressed position illustrated in FIG. 1c.

Further, in the illustrated embodiment, the third leaf spring 11 is convexly shaped with its convex side facing inwardly (to the left in FIG. 1a). In a different embodiment of the spring assembly (for example as illustrated in FIG. 2) such a convexly shaped third leaf spring 11 could lead to a progressive engagement between said third leaf spring 11 and the second leaf spring 9 when the angle β between the second and third leaf springs 9 and 11, respectively, decreases.

Now referring to FIG. 2, a slightly varied embodiment of a spring assembly 7" is illustrated. In this embodiment, the second leaf spring 9 comprises an inward bay or bowed section 12 adjoining its first end 9' and a straight section 13 adjoining its second end 9". This straight section 13 and bay section 12 influence the spring characteristic of the spring assembly 7" due to a co-operation with the convexly shaped third leaf spring 11, due to a special shape of the top curved section 10', will progressively engage the second leaf spring 9 when the second end 11" of the third leaf spring 11 moves towards the first end 8' of the first leaf spring 8.

Further, in the embodiment illustrated in FIG. 2, the first leaf spring 8 has a greater length than the first leaf spring 8 of the previously described spring assembly 7' and provides a further tool for influencing the spring characteristic.

It is noted, that the invention is not limited to the embodiments described before which may be varied widely within the scope of the invention as defined by the claims. Thus, the shape of the individual leaf springs may be varied in accordance with a desired spring characteristic of the spring assembly.

What is claimed is:

1. A spring assembly for interposition between two elements of an open roof construction for a vehicle that are movable relative to each other, the spring assembly comprising:

three leaf portions, wherein a first leaf portion with a first end is connected to a first end of a second leaf portion while defining an acute angle therebetween, wherein a third leaf portion with a first end is connected to a second end of the second leaf portion while defining an angle therebetween, whereas the third leaf portion with a second end slidingly engages the first leaf portion, and wherein the first and second leaf portions each being for engaging one of the elements.

2. The spring assembly according to claim 1, wherein the first leaf portion is concavely shaped with its concave side facing outwardly from the assembly.

3. The spring assembly according to claim 1, wherein the first leaf portion substantially comprises two straight sections defining an obtuse angle therebetween.

4. The spring assembly according to claim 1, wherein the second leaf portion is concavely shaped with its concave side facing outwardly from the assembly.

5. The spring assembly according to claim 4, wherein the second leaf portion comprises an inward bay adjoining its first end and, connected therewith, a straight section adjoining its second end.

6. The spring assembly according to claim 1, wherein the third leaf portion is positioned such that the angle between the first and second leaf portions decreases as the second end of the third leaf portion moves along the first leaf portion towards the first end of the first leaf portion.

7. The spring assembly according to claim 6, wherein the third leaf portion is convexly shaped with its convex side facing inwardly such as to progressively engage the second leaf portion when the angle between the second and third leaf portions decreases.

8. The spring assembly according to claim 1, wherein the leaf portions are integrally connected to each other and formed from a single unitary body.

9. The spring assembly according to claim 8, wherein the connections between the leaf portions are defined as curved resilient sections.

10. The spring assembly according to claim 1, wherein the second end of the first leaf portion and the second end of the third leaf portion are rounded.

11. An open roof construction for a vehicle, comprising:
a fixed roof construction and a wind deflector hingeably connected with the fixed roof construction; and a spring assembly engaging the fixed roof construction and the wind deflector to move the wind deflector, the spring assembly comprising: three leaf portions, wherein a first leaf portion with a first end is connected to a first end of a second leaf portion while defining an acute angle therebetween, wherein a third leaf portion with a first end is connected to a second end of the second leaf portion while defining an angle therebetween, whereas the third leaf portion with a second end slidingly engages the first leaf portion, and wherein the first and second leaf portions each engage one of the fixed roof construction and wind deflector.

12. The open roof construction according to claim 11, wherein the first leaf portion is concavely shaped with its concave side facing outwardly from the assembly.

13. The open roof construction according to claim 11, wherein the first leaf portion substantially comprises two straight sections defining an obtuse angle therebetween.

14. The open roof construction according to claim 11, wherein the second leaf portion is concavely shaped with its concave side facing outwardly from the assembly.

15. The open roof construction according to claim 14, wherein the second leaf portion comprises an inward bay adjoining its first end and, connected therewith, a straight section adjoining its second end.

16. The open roof construction according to claim 11, wherein the third leaf portion is positioned such that the angle between the first and second leaf portions decreases as the second end of the third leaf portion moves along the first leaf portion towards the first end of the first leaf portion.

17. The open roof construction according to claim 16, wherein the third leaf portion is convexly shaped with its convex side facing inwardly such as to progressively engage the second leaf portion when the angle between the second and third leaf portions decreases.

18. The open roof construction according to claim 11, wherein the leaf portions are integrally connected to each other and formed from a single unitary body.

19. The open roof construction according to claim 18, wherein the connections between the leaf portions are defined as curved resilient sections.

20. The open roof construction according to claim 11, wherein the second end of the first leaf portion and the second end of the third leaf portion are rounded.

* * * * *